(12) United States Patent
Julian

(10) Patent No.: US 6,694,021 B1
(45) Date of Patent: Feb. 17, 2004

(54) TELEPHONE HANDSET SANITARY GUARD

(76) Inventor: Joseph G Julian, 8002 Bayard Ct., Pittsburgh, PA (US) 15237

( * ) Notice: Subject to any disclaimer, the term of this patent is extended or adjusted under 35 U.S.C. 154(b) by 963 days.

(21) Appl. No.: 08/762,973

(22) Filed: Dec. 10, 1996

Related U.S. Application Data

(60) Provisional application No. 60/008,609, filed on Dec. 14, 1995.

(51) Int. Cl.⁷ .................................................. H04M 1/00
(52) U.S. Cl. ....................................... 379/452; 379/439
(58) Field of Search ................................. 379/452, 439, 379/451, 437

(56) References Cited

U.S. PATENT DOCUMENTS

| | | | |
|---|---|---|---|
| 3,962,555 A | 6/1976 | Efaw | 179/185 |
| 4,546,217 A | 10/1985 | Frehn | 179/185 |
| 4,570,038 A | 2/1986 | Tinelli | 179/185 |
| 4,736,418 A | 4/1988 | Steadman | 379/451 |
| 4,751,731 A | 6/1988 | O'Connor | 379/439 |
| 4,819,264 A | 4/1989 | Lemley | 379/452 |
| 4,819,265 A | 4/1989 | Colella | 379/452 |
| 4,852,163 A | 7/1989 | Caceres | 379/452 |
| 4,876,715 A | 10/1989 | Neubert | 379/452 |
| 4,949,377 A | 8/1990 | Nisihina et al. | 379/452 |
| 4,953,567 A | 9/1990 | Ward | 128/851 |
| 4,953,703 A | 9/1990 | Virginio | 206/451 |
| 4,964,161 A | 10/1990 | Trowbridge, Jr. | 379/452 |
| 5,054,063 A | 10/1991 | Lo et al. | 379/452 |
| 5,136,640 A | 8/1992 | Kim | 379/452 |
| 5,396,557 A | 3/1995 | Tonci | 379/452 |

FOREIGN PATENT DOCUMENTS

| | | | | |
|---|---|---|---|---|
| DE | 2528676 | | 1/1977 | 379/452 |
| EP | 484267 A | | 5/1992 | 379/451 |

*Primary Examiner*—Jack Chiang
(74) *Attorney, Agent, or Firm*—Douglas G. Glantz

(57) ABSTRACT

A sanitary covering for a telephone handset is disclosed. The novel article and method include providing a front sheet and a back sheet composed of flexible nonwoven fabric material to form a pocket covering for a flexible telephone handset sanitary guard. In one aspect, impact bonds on the left side, top, and right side form a length of about 13 inches, an insertion point width of about 4.25 inches, and a narrower telephone handset holding zone width of about 3.75 inches. In one aspect, polypropylene fibers are provided having a fabric weight of less than about 30 pounds/ream. A slit on at least one of the pocket covering sides extends about 3.5 inches from the insertion point to the narrower telephone handset holding zone width. Printed indicia on at least the front sheet indicates the nature of the intended use and instructions for the method of use of the article. The flexible sanitary guard of the invention is dispensed from a dispenser located at public telephone stations or through purchase through conventional vending machines or over-the-counter "travel-packs."

16 Claims, 2 Drawing Sheets

TELEPHONE HANDSET SANITARY GUARD

This application claims benefit of Ser. No. 60/008,609, filed Dec. 14, 1995.

BACKGROUND OF THE INVENTION

1. Field of the Invention

This invention relates to sanitary guards for telephone handsets.

2. Background

The telephone today plays an extremely important part in practically everything taking place, and more effort should be directed at stopping diseases which may be spread through contact with a telephone.

Public telephones, in particular public telephones in airports, are handled by a multitude of people each day. In the event that just one of this multitude of persons was sick, every subsequent user is subject to infection by whatever germs might be able to sustain themselves until being passed on.

Other than germs, telephones handled by large numbers of people may from time to time accumulate other undesirable substances thereon, e.g., grease.

In this respect, although it may not be feasible or probable to eliminate these accumulations at their inception, precautions may be taken by any particular user to resist the spreading of them.

A number of attempts have been made to provide a solution to the problems stated above, but have failed apparently for one reason or another. The absence of items on the market in use evidences insufficiency of public acceptance.

One such prior device is shown by U.S. Pat. No. 1,833,643. This patent expressly discloses a protector for only the mouthpiece of a telephone. The protector includes a disinfectant material and an elaborate mechanism for causing the disinfectant to be released onto the mouthpiece.

U.S. Pat. No. 3,238,313 discloses another protector for telephone mouthpieces. While one of the stated objects of the patent is low cost manufacturing of the item, the description includes a complicated construction of a filter 13 for the protector at Column 1, line 1, through Column 2, line 18.

Two other U.S. Pat. Nos. 3,001,033 and 3,148,249 disclose covers for the mouthpieces only of telephones. The latter of these two patents has as a primary object the interception of particles or germs ejected from the mouth of a user of the telephone.

As noted above, incentives to take initial preventive measures are often lacking. The instant problem is more realistically approached by assuming the presence of particles and/or germs and taking steps to prevent the spreading thereof.

U.S. Pat. No. 3,169,171 does disclose, if only impliedly, the use of protective covers on both the receivers and transmitter (i.e., mouthpiece) of telephones. However, the suggested solution involves placing identical, wholly independent, caps over each of the receiver and transmitter of a phone. This is inconvenient and also possibly uneconomical.

U.S. Pat. No. 3,962,555 discloses a telephone guard constructed of sheet vinyl or polyethylene including a first cap covering the receiver, i.e., earpiece, and a second cap covering the transmitter, i.e., mouthpiece of the telephone handset. Both the first and second caps include on the face thereof a perforated surface which may be constructed by providing holes therethrough, or any other suitable method.

INTRODUCTION TO THE INVENTION

The primary object of this invention is to provide a new and improved sanitary guard for telephone handsets.

Further objects of this invention are to provide a new and improved sanitary guard for telephone handsets which restricts the spread of germs to users of the telephone, which restricts transfer of dirt and/or grease to and from the telephone, which is useful in a decorative manner, and which is useful as an advertising means.

Other objects of this invention are to provide a new and improved guard for telephone handsets which is extremely economical to produce, which is not exceedingly complicated to use, which is compact and portable, and which may be easily dispensed or carried by a user to be installed when desired.

Still further objects of this invention are to provide a new and improved sanitary guard for telephone handsets which covers both the receiver and transmitter, which covers a portion of the handle of the handset and which is a one piece unit.

Yet another object of this invention is to provide a new and improved guard for telephone handsets which includes a removable, replaceable germ retarding material at the face of both the receiver and the transmitter.

A further object of this invention is to provide a new and improved guard for telephone handsets which obtains one or more of the objects and advantages set forth above.

These and other objects and advantages of this invention will become apparent from the following description thereof, in view of the accompanying drawings.

These and other objects of the present invention will be described in the detailed description of the invention which follows. These and other objects of the present invention will become apparent to those skilled in the art from a careful review of the detailed description and from reference to the figures of the drawings.

SUMMARY OF THE INVENTION

The present invention provides sanitary covering for a handset of a telephone. The article and method of the present invention include providing a front sheet and a back sheet composed of flexible nonwoven fabric material to form a pocket covering for receiving a telephone handset and provide a flexible sanitary guard. In one aspect, impact bonds on the front sheet and the back sheet on the left side, top, and right side of the pocket covering form a length of about 13 inches, an insertion point width of about 4.25 inches, and a narrower telephone handset holding zone width of about 3.75 inches. In one aspect, the article and method of the present invention include providing polypropylene fibers having a fabric weight of less than about 30 pounds/ream. The article and method of the present invention include providing a slit on at least one of the pocket covering sides extending from the insertion point to the narrower telephone handset holding zone width. Printed indicia on at least the front sheet indicates the nature of the intended use and instructions for the method of use of the article. The invention further includes means and method for dispensing the flexible sanitary guard from a dispenser located near a public telephone station.

DETAILED DESCRIPTION OF THE PREFERRED EMBODIMENT

Figure 1:
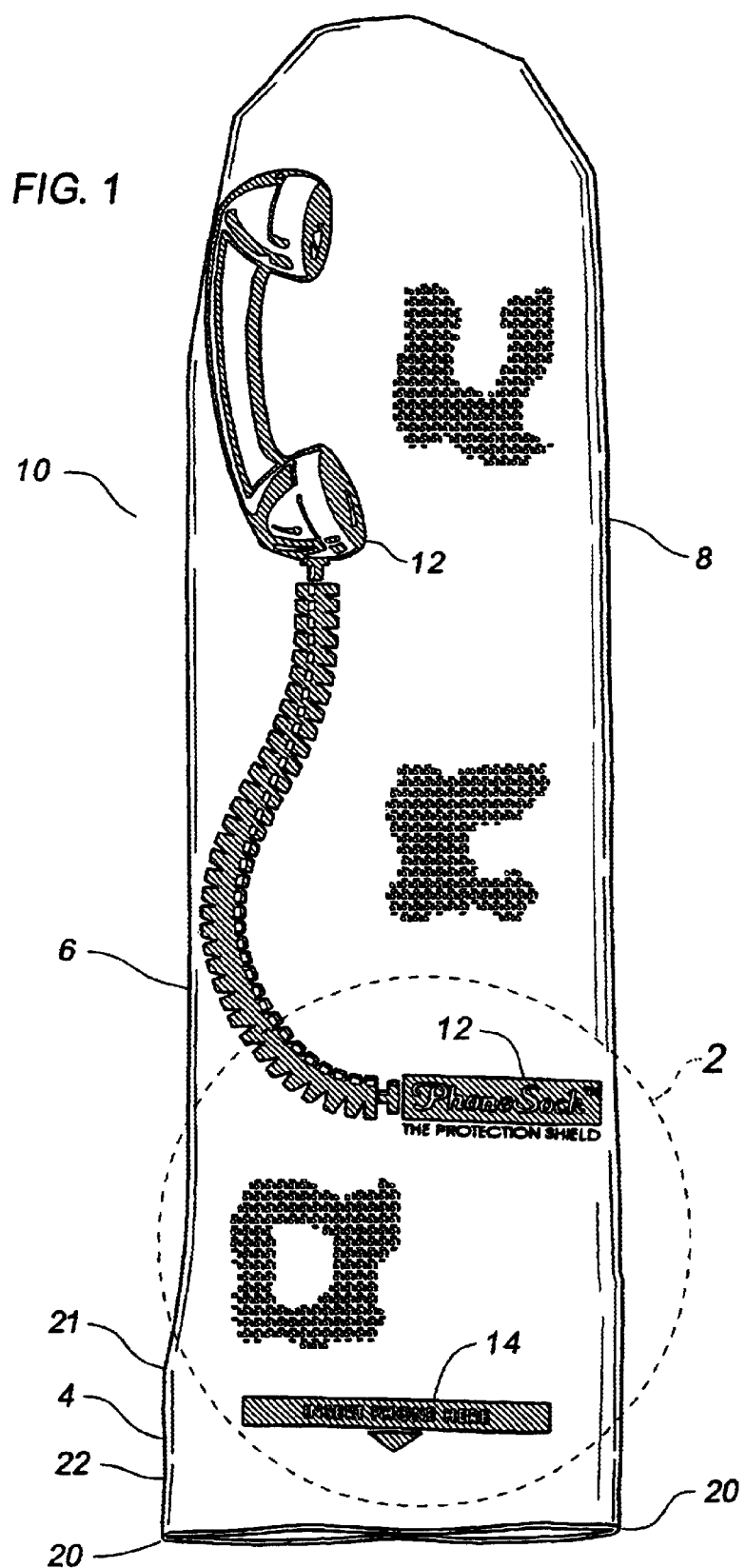
FIG. 1 is a front elevational perspective view of a telephone handset guard in accordance with the present invention.

The present invention concerns a one piece, disposable Phone Sock™ telephone handset sanitary guard which covers both the receiver and transmitter of the handset. The telephone handset guard of the present invention is a flexible sleeve designed to cover a phone receiver handle to prevent the transmission of germs. It is disposable and made from a disposable fabric material.

The telephone handset guard of the present invention is fabricated by forming two sheets of disposable fabric material and sealing on three edges to create a pocket. A suitable material is flexible white heavyweight thermally bonded nonwoven fabric material.

The manufacturing process for the fabrication of the telephone guard of the present invention preferably is an impact process where the physical pounding of the impact fuses the fibers of the fabric. The preferred process provides a cleaner, smoother edge. In the preferred manufacturing process, no stitching is visible to the user. Moreover, the present invention eliminates excess material on the outside of the stitching. The preferred process provides less waste and thereby is more efficient. The preferred process avoids the use of any chemical bonding material which would evoke a possible allergic reaction in certain individuals.

Preferably, the nonwoven fabric material of the present invention is composed of polypropylene fabric, more preferably, 100% polypropylene fabric.

Preferred physical characteristics of such a fabric for use in the article and method of the present invention include a fabric weight of less than about 30 pounds/ream, e.g., such as at about 20 pounds/ream, 1 ounce per square yard, 28.35 grams per square yard, 33.91 grams per square meter.

It has been found empirically that the preferred fabric weight of the present invention provides for a product which is less bulky, easier to install on a telephone handset, provides sufficient structural strength, and does not interfere with sound transmission.

The preferred fabric of the present invention has a thickness of about 10 mils. The strip breaking load in the cross direction dry is about 28 ounces/inch or 800 grams/inch. The strip breaking load in the machine direction dry is about 148 ounces/inch or 4200 grams/inch. The cross direction percent stretch is about 110, and the machine direction percent stretch is about 40.

The nonwoven fabric material composed of 100% polypropylene fabric when incorporated in combination with the article and method of the present invention provides a thinner, high softness, comfortable feel, while maintaining high structural integrity and high auditory transmission characteristics. The preferred fabric also works well in the impact method of fabrication employed in the manufacture of the telephone guard of the present invention.

The pocket of the telephone handset guard of the present invention slips over the phone handle, and the telephone handset guard of the present invention is discarded after use.

The telephone handset guard of the present invention is compact enough to be capable of folding or otherwise manipulated to be held by and dispensed from a dispenser such as is employed to dispense disposable toilet seat tissue covers in public lavatory facilities. The guard also may be carried on or with a person without causing inconvenience.

Referring now to FIG. 1, a telephone guard indicated generally at 10 is shown constructed of a flexible white heavyweight thermally bonded nonwoven fabric material.

The fabric pattern indicated in the drawings is continuous throughout and is continuing onto the rear surface.

The guard has a bottom insertion point width dimension 4 of about 4.25 inches, a top telephone handset holding width dimension 6 of about 3.75 inches, and a length 8 of about 13 inches. The dimensions were determined empirically from actual experimentation using conventional telephone handsets used today, particularly in public telephone booths. The wider insertion point and narrower holding width were found to be required to insert, fit, and hold the telephone handset properly.

Ease of insertion of the telephone handset was determined by clinical trials to be a critical component of the sanitary guard of the present invention. Through personal trials, a quick insertion was determined to be critical to facilitate the end user wanting to use the product. The particular configuration having a wider bottom and an open flap were found to be required to reduce the time and effort for the end user to use the product in accordance with its intended use.

An angle is placed on the bottom portion of sanitary guard 10. It was found that the guard of the present invention had a better fit onto the phone when the guard included a squared off corner 20 as opposed to a rounded corner.

It was found that a cut or slit 22 extending approximately 3.5 inches along one side of the full length of the squared corner 20 to point 21 is needed to provide for ease of insertion of the telephone handset into the sanitary guard. The length from the insertion point of squared corner 20 to point 21 is about 3.5 inches.

The telephone guard of the present invention is a one piece guard for covering the receiver, i.e., earpiece, and also for covering the transmitter, i.e., mouthpiece of the telephone handset.

The telephone guard of the present invention includes printed indicia 12 and printed instructional indicia 14 indicating the nature of the intended use and instructions for the method of use. Advertising printed matter (not shown) also may be included on the front or back surface of the telephone guard of the present invention.

The preferred fabric is provided so that sound may be emitted through the guard 10 from and to the telephone handset.

Figure 2:
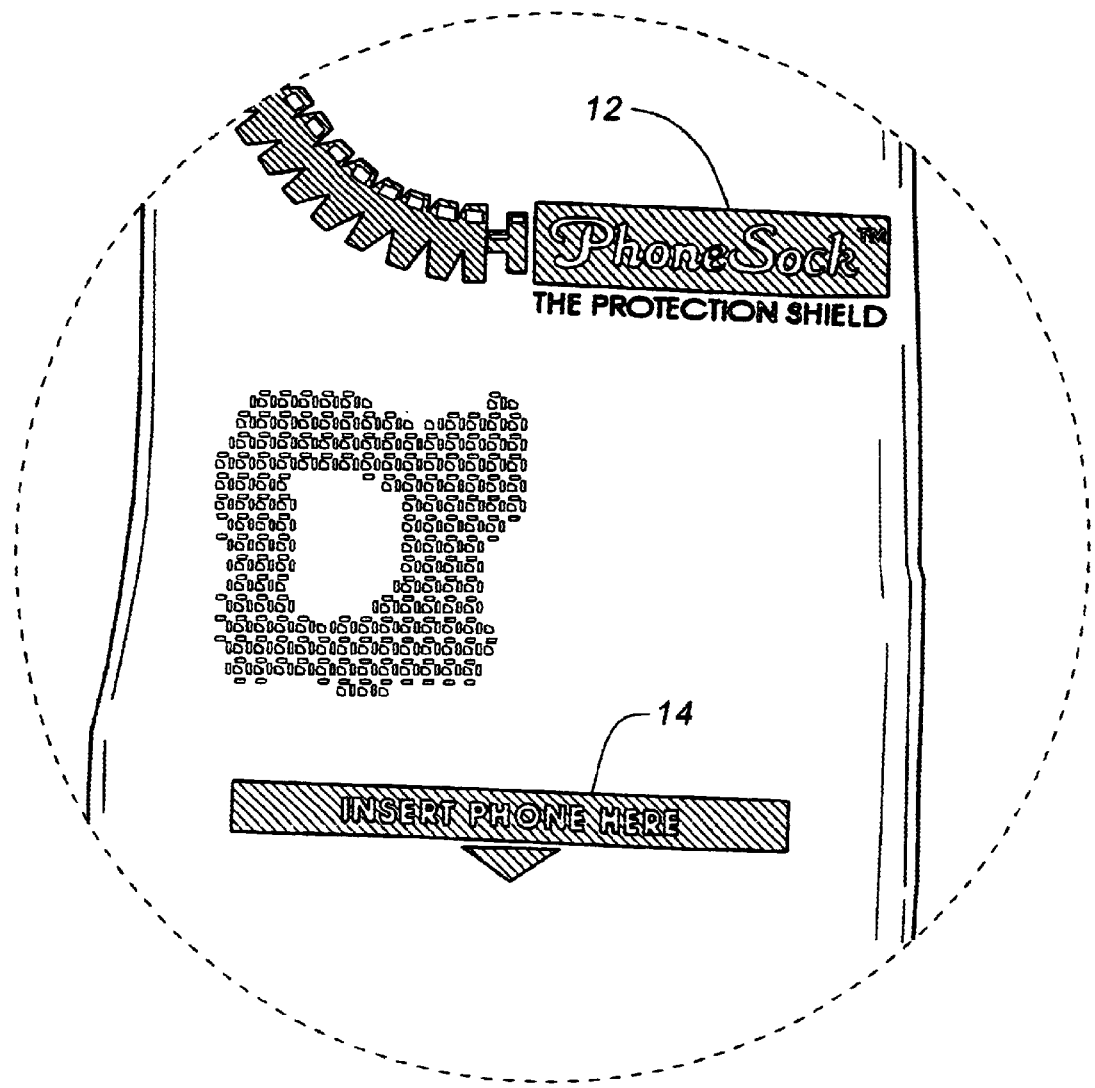
FIG. 2 is a detailed perspective view of a portion of the bottom front area of the telephone handset guard in accordance with the present invention.

Referring now to FIG. 2, the appearance of the guard 10 having printed indicia 12 and printed instructional indicia 14 is more easily understood.

The guard 10 as noted above is installed on a telephone handset and formed to conform to the shape of the relevant portion of the telephone handset and provide means for restricting the passage of germs to and/or from the telephone handset.

The telephone guard of the present invention can be used in public telephone booths, e.g. in an airport, or other locations where a telephone may be accessible to the public, such as in a nurses station in a hospital or physician's office or in hotel rooms.

The telephone guard of the present invention is capable of dispensing the flexible sanitary guard from a dispenser located near a public telephone station, through purchase from conventional vending machines or over-the-counter "travel-packs."

Thus, it can be seen that the present invention accomplishes all of the stated objectives.

Although the invention has been illustrated by the preceding detailed description, it is not intended to be construed as being limited to the specific preferred embodiments employed therein.

Modifications, changes, and improvements to the preferred forms of the invention herein disclosed, described, and illustrated may occur to those skilled in the art who come to understand the principles and precepts thereof. Accordingly, the scope of the patent to be issued hereon should not be limited to the particular embodiments of the invention set forth herein, but rather should be defined by the advance by which the invention has promoted the art.

Whereas particular embodiments of the invention have been described hereinabove, for purposes of illustration, it will be evident to those skilled in the art that numerous variations of the details may be made without departing from the invention as defined in the appended claims.

What is claimed is:

1. An article for covering a handset of a telephone, comprising:

a flexible sanitary guard covering for a telephone handset, said covering having a front sheet and a back sheet composed of flexible nonwoven fabric material bonded together to form a pocket covering for receiving said telephone handset, (a) wherein said front sheet and said back sheet are bonded together on a left side, a top, and a right side by impact bonding to form said pocket covering;

(b) wherein said pocket covering has an insertion point wider than a narrower telephone handset holding zone width;

(c) wherein said pocket covering has a slit on at least one of said sides, said slit extending from said insertion point to said narrower telephone handset holding zone width;

(d) further comprising printed indicia means on at least said front sheet for indicating the nature of the intended use and instructions for the method of use of said article;

(e) wherein said pocket covering includes printed indicia on at least said front sheet indicating the nature of the intended use as a telephone handset sanitary guard and instructions for the method of use of said article; and (f) wherein said flexible nonwoven fabric material comprises flexible white heavyweight thermally bonded nonwoven fabric material having a fabric weight of less than about 30 pounds/ream.

2. The article according to claim 1, wherein said flexible nonwoven fabric material is composed of polypropylene fibers.

3. The article according to claim 1, wherein said flexible nonwoven fabric material comprises flexible white heavyweight thermally bonded nonwoven fabric material having a fabric weight of about 20 pounds/ream.

4. The article according to claim 2, wherein said flexible nonwoven fabric material is composed of 100% polypropylene.

5. The article according to claim 4, wherein said fabric material has a fabric weight of about 1 ounce per square yard, (28.35 grams per square yard, 33.91 grams per square meter).

6. The article according to claim 5, wherein said fabric material has a thickness of about 10 mils.

7. The article according to claim 6, wherein said fabric material has a strip breaking load in the cross direction dry of about 28 ounces/inch (800 grams/inch).

8. The article according to claim 7, wherein said fabric material has a strip breaking load in the machine direction dry of about 148 ounces/inch (4200 grams/inch).

9. The article according to claim 8, wherein said fabric material has cross direction percent stretch of about 110.

10. The article according to claim 9, wherein said fabric material has machine direction percent stretch of about 40.

11. A process for providing a flexible sanitary guard covering for a telephone handset, comprising:

(a) providing a flexible sanitary guard covering for a telephone handset, said covering having a front sheet and a back sheet composed of flexible nonwoven fabric material bonded together to form a pocket covering for receiving said telephone handset, wherein said front sheet and said back sheet are bonded together on a left side, a top, and a right side to form said pocket covering, further wherein said pocket covering has an insertion point wider than a narrower telephone handset holding zone width and a slit on at least one of said sides, said slit extending from said insertion point to said narrower telephone handset holding zone width;

(b) indicating the intended use of said article as a telephone handset sanitary guard and providing instructions on said article for the method of use of said article as said telephone handset sanitary guard;

(c) wherein said indicating the intended use of said article as a telephone handset sanitary guard and providing instructions on said article comprises providing printed indicia on at least said top sheet indicating the nature of the intended use and instructions for the method of use of said flexible sanitary guard coverings and (d) wherein said flexible nonwoven fabric material comprises flexible white heavyweight thermally bonded nonwoven fabric material having a fabric weight of less than about 30 pounds/ream.

12. The process for providing a flexible sanitary guard covering for a telephone handset according to claim 11, further comprising dispensing said flexible sanitary guard from a dispenser located near a public telephone station at an airport.

13. The process for providing a flexible sanitary guard covering for a telephone handset according to claim 11, wherein said flexible nonwoven fabric material is composed of polypropylene fibers.

14. The process for providing a flexible sanitary guard covering for a telephone handset according to claim 13, wherein said flexible nonwoven fabric material consists essentially of 100% polypropylene.

15. The process for providing a flexible sanitary guard covering for a telephone handset according to claim 11, wherein said fabric material has a thickness of about 10 mils.

16. An article for covering a handset of a telephone, comprising:

(a) a front sheet composed of flexible nonwoven fabric material of polypropylene fibers having a fabric weight of less than about 30 pounds/ream and a thickness of about 10 mils;

(b) a back sheet composed of flexible nonwoven fabric material of said polypropylene fibers bonded together to said front sheet to form a pocket covering for receiving a telephone handset to provide a flexible sanitary guard covering;

(c) impact bonds on said front sheet and said back sheet on the left side, top, and right side of said pocket covering to form a pocket, an insertion point width, and a telephone handset holding zone width narrower than said insertion point width;

(d) a slit on one of said pocket covering sides, said slit extending from said insertion point to said narrower telephone handset holding zone width;

(e) printed indicia on at least said front sheet indicating the nature of the intended use as a telephone handset sanitary guard and instructions for the method of use of said article as a telephone handset sanitary guard; and (f) means for dispensing said flexible sanitary guard from a dispenser located near a public telephone station.

* * * * *